United States Patent
Yamauchi

(10) Patent No.: US 10,874,101 B2
(45) Date of Patent: Dec. 29, 2020

(54) TOLERANCE IMPROVING AGENT FOR PLANTS

(71) Applicants: Yasuo Yamauchi, Kobe (JP); PHYTOCHROME INC., Tokyo (JP)

(72) Inventor: Yasuo Yamauchi, Kobe (JP)

(73) Assignees: Yasuo Yamauchi, Kobe (JP); PHYTOCHROME INC., Tokyo (JP)

( * ) Notice: Subject to any disclaimer, the term of this patent is extended or adjusted under 35 U.S.C. 154(b) by 0 days.

(21) Appl. No.: 15/506,610

(22) PCT Filed: Aug. 24, 2015

(86) PCT No.: PCT/JP2015/073735
§ 371 (c)(1),
(2) Date: Feb. 24, 2017

(87) PCT Pub. No.: WO2016/031775
PCT Pub. Date: Mar. 3, 2016

(65) Prior Publication Data
US 2018/0235217 A1    Aug. 23, 2018

(30) Foreign Application Priority Data
Aug. 25, 2014   (JP) ................. 2014-170544

(51) Int. Cl.
*A01N 35/02*    (2006.01)
*A01G 7/06*    (2006.01)

(52) U.S. Cl.
CPC .............. *A01N 35/02* (2013.01); *A01G 7/06* (2013.01)

(58) Field of Classification Search
CPC .................................................. A01N 35/02
See application file for complete search history.

(56) References Cited

U.S. PATENT DOCUMENTS

| | | | | |
|---|---|---|---|---|
| 3,820,975 | A * | 6/1974 | Poje ................ | A01N 35/06 47/2 |
| 6,855,669 | B2 * | 2/2005 | Knowles ............ | A01N 35/02 504/348 |
| 9,185,914 | B2 | 11/2015 | Frackenpohl et al. | |
| 2008/0207608 | A1 | 8/2008 | Kumar et al. | |
| 2009/0062126 | A1 * | 3/2009 | Knowles ............ | A01N 31/02 504/348 |
| 2012/0225781 | A1 | 9/2012 | Rodriguez-Kabana et al. | |
| 2014/0087949 | A1 | 3/2014 | Frackenpohl et al. | |

FOREIGN PATENT DOCUMENTS

| | | |
|---|---|---|
| JP | 2007-532632 A | 11/2007 |
| JP | 2009-055832 A | 3/2009 |
| JP | 2010-083804 A | 4/2010 |
| JP | 2011-157307 A | 8/2011 |
| JP | 2014-511868 A | 5/2014 |

OTHER PUBLICATIONS

Gitelson et al., "Volatile Metabolites of Higher Plant Crops as a Photosynthesizing Life Support System Component Under Temperature Stress at Different Light Intensities," *Adv. Space Res.*, 31(7): 1781-1786 (2003).

Kawai et al., "A non-toxic heat shock protein 70 inducer, geranyl-geranyl-acetone, restores the heat shock response in gastric mucosa of protein-malnourished rats," *J. Lab. Clin. Med.*, 136(2): 138-148 (2000).

Nakamoto et al., "Physiological and molecular analyses of effects of malondialdehyde during heat stress in *Arabidopsis*," *The 41st Proceedings of the Annual Meeting of the Japanese Society for Chemical Regulation of Plants*, 41 (Supplement): 59 (2006).

Yamauchi et al., "Bifunctional roles of malondialdehyde on heat-stressed *Arabidopsis*," *The 49th Proceedings of the Annual Meeting of the Japanese Society for the Chemical Regulation of Plants*, 49: 83, abstract S05-5(S27) (2008).

Japanese Patent Office, International Preliminary Report on Patentability in International Patent Application No. PCT/JP2015/073735 (dated Feb. 3, 2016).

Japanese Patent Office, International Search Report in International Patent Application No. PCT/JP2015/073735 (dated Oct. 20, 2015).

Scharf et al., "The plant heat stress transcription factor (Hsf) family: Structure, function and evolution," *Biochim. Biophys. Acta*, 1819(2): 104-119 (2012).

* cited by examiner

*Primary Examiner* — Johann R Richter
*Assistant Examiner* — Danielle Sullivan
(74) *Attorney, Agent, or Firm* — Leydig, Voit & Mayer, Ltd.

(57) ABSTRACT

Provided is a tolerance improving agent that can increase or improve environmental stress tolerances (high-temperature tolerance, drought tolerance and the like) of plants. The tolerance improving agent is constituted of at least one kind of unsaturated carbonyl compound selected from unsaturated aldehyde and unsaturated ketone. Such unsaturated carbonyl compound is, for example, a compound having 4-9 carbon atoms, which does not have an unsaturated bond at the terminal, and may be at least one kind selected from α,β-alkenal, α,β-alkanone, γ,δ-alkenal, γ,δ-alkanone, δ,ε-alkenal, δ,ε-alkanone, ε,ζ-alkenal, and ε,ζ-alkanone.

3 Claims, No Drawings

Specification includes a Sequence Listing.

TOLERANCE IMPROVING AGENT FOR PLANTS

CROSS-REFERENCE TO RELATED APPLICATIONS

This patent application is the U.S. national phase of International Patent Application No. PCT/JP2015/073735, filed on Aug. 24, 2015, which claims the benefit of Japanese Patent Application No. 2014-170544, filed on Aug. 25, 2014, the disclosures of which are incorporated herein by reference in their entireties for all purposes.

TECHNICAL FIELD

The present invention relates to a tolerance improving agent capable of at least increasing or improving heat tolerance (high-temperature tolerance) of plants.

BACKGROUND ART

Due to global warming in recent years, the high temperature injury in the summer season has become a major problem in the agricultural field. Conventionally, installation of outdoor awnings, installation of ventilation fans in a house, and the like are performed to prevent high temperature injury; however, they cannot be easily performed due to the high costs required. Therefore, the development of a high-temperature tolerance inducing agent for plants, which is easily utilizable in many agricultural fields, has been desired.

Under such circumstances, the present inventor reported in JP-A-2011-157307 (patent document 1) that particular compounds such as ethylvinylketone and hydroxyacrolein induce high-temperature tolerance in plants.

DOCUMENT LIST

Patent Document patent document 1: JP-A-2011-157307

SUMMARY OF THE INVENTION

Problems to be Solved by the Invention

An object of the present invention is to provide a tolerance improving agent capable of increasing or improving not only heat tolerance (high-temperature tolerance) but also other tolerances (drought tolerance, disease tolerance, light resistance and the like), and a method of improving tolerance of plants by using the tolerance improving agent.

Another object of the present invention is to provide a tolerance improving agent capable of increasing or improving tolerances such as heat tolerance and the like without inhibiting photosynthesis, and a method of improving tolerance of plants by using the tolerance improving agent.

A still another object of the present invention is to provide a tolerance improving agent constituted of a novel unsaturated carbonyl compound capable of increasing or improving heat tolerance and the like, and a method of improving tolerance of plants by using the tolerance improving agent.

Another object of the present invention is to provide an agent for activating (or expressing) a gene (HSFA2 gene, DREB2A gene) effective for increasing or improving various tolerances.

Means of Solving the Problems

The present inventor has conducted intensive studies in an attempt to solve the above-mentioned problems, and found that unsaturated carbonyl compounds including the compound described in patent document 1 can increase or improve not only high-temperature tolerance but also other tolerances (environmental stress tolerances) such as drought tolerance and the like, particularly that a particular unsaturated carbonyl compound can increase or improve such tolerance without, surprisingly, inhibiting photosynthesis, which resulted in the completion of the present invention.

That is, the tolerance improving agent of the present invention is a tolerance improving agent for increasing or improving heat tolerance (high-temperature tolerance) of plants, and is a tolerance increasing agent (tolerance improving agent) containing at least one kind of unsaturated carbonyl compound selected from unsaturated aldehyde and unsaturated ketone.

Such tolerance improving agent may particularly increase or improve heat tolerance and other tolerances (environmental stress tolerances). Such other tolerance may be at least one kind of tolerance selected from drought tolerance, disease tolerance, light resistance (UV resistance), oxidation resistance, tolerance to low temperature (low temperature tolerance), osmotolerance and salinity tolerance. Particularly, the tolerance may be drought tolerance. In this case, the tolerance improving agent may further increase or improve, in addition to heat tolerance and drought tolerance, other tolerances (tolerances other than heat tolerance and drought tolerance, for example, at least one kind of tolerance selected from disease tolerance, light resistance, oxidation resistance, low temperature tolerance, osmotolerance and salinity tolerance).

Unsaturated carbonyl compound may particularly be a compound that does not have an unsaturated bond at the terminal (compound having an internal unsaturated bond), or a compound that does not have only a $\beta,\gamma$-unsaturated bond (unsaturated bond of $\beta$ carbon and $\gamma$ carbon relative to carbonyl carbon, hereinafter the same in similar expressions). The compound that does not have only a $\beta,\gamma$-unsaturated bond may have a $\beta,\gamma$-unsaturated bond as an unsaturated bond as long as it does not have only $\beta,\gamma$-unsaturated bond (for example, having $\delta,\varepsilon$-unsaturated bond, $\varepsilon,\zeta$-unsaturated bond and the like).

By particularly selecting such unsaturated carbonyl compound from unsaturated carbonyl compounds, a tolerance improving agent provided with superior high-temperature tolerance (and further, other tolerances) can be obtained without inhibiting (substantially inhibiting) photosynthesis. Therefore, when the tolerance improving agent of the present invention contains such particular unsaturated carbonyl compound (particularly, a compound that does not have an unsaturated bond at the terminal and does not have only a $\beta,\gamma$-unsaturated bond), the tolerance improving agent may be a tolerance improving agent for particularly increasing or improving heat tolerance.

A representative unsaturated carbonyl compound is a compound having 4-20 (particularly 4-9) carbon atoms, which does not have an unsaturated bond at the terminal, and at least one kind selected from $\alpha,\beta$-alkenal, $\alpha,\beta$-alkanone, $\gamma,\delta$-alkenal, $\gamma,\delta$-alkanone, $\delta,\varepsilon$-alkenal, $\delta,\varepsilon$-alkanone, $\varepsilon,\zeta$-alkenal, and $\varepsilon,\zeta$-alkanone, and the like can be mentioned.

The unsaturated carbonyl compound may be a compound that does not have only an $\alpha,\beta$-unsaturated bond (and $\beta,\gamma$-unsaturated bond), for example, a carbonyl compound having at least one kind of unsaturated bond selected from γ,δ-unsaturated bond, δ,ε-unsaturated bond, and ε,ζ-unsaturated bond.

Such unsaturated carbonyl compound is different from the α,β-unsaturated carbonyl compound disclosed in patent document 1, and is a particular unsaturated carbonyl compound confirmed for the first time in the present invention to have an improving effect on heat tolerance and the like. Since such particular unsaturated carbonyl compound is provided with a high-temperature tolerance improving function similar to that of the α,β-unsaturated carbonyl compound, it can be used as a tolerance improving agent for increasing or improving heat tolerance, and may be used as a tolerance improving agent for increasing or improving heat tolerance and other tolerances.

The tolerance improving agent of the present invention may be a tolerance improving agent that does not inhibit (substantially inhibit) photosynthesis. It appears that photosynthesis is easily inhibited when a carbonyl compound having an unsaturated bond at the terminal (e.g., carbonyl compound having vinyl group at the terminal such as ethylvinylketone and hydroxyacrolein which are considered to be preferable in patent document 1) is used. Therefore, in the present invention, as such unsaturated carbonyl compound constituting a tolerance improving agent that does not inhibit photosynthesis, a carbonyl compound that does not have an unsaturated bond at the terminal (or has an internal unsaturated bond) may be preferably used.

The tolerance improving agent of the present invention can increase or improve heat tolerance of plants by application (provision) to the plants. Therefore, the present invention also includes a method of increasing or improving heat tolerance [further, other tolerances (e.g., drought tolerance and the like)] of plants, comprising treating the plants with the aforementioned tolerance improving agent.

This method may be a method of increasing or improving heat tolerance of plants, comprising treating the plants with, particularly, a tolerance improving agent containing an unsaturated carbonyl compound that does not have an unsaturated bond at the terminal and does not have only a β,γ-unsaturated bond.

The aforementioned unsaturated carbonyl compound can, as mentioned above, increase or improve tolerances such as heat tolerance and the like. In the present invention, such increasing or improving effect has been confirmed also at a gene level.

To be specific, the aforementioned unsaturated carbonyl compound has a function to activate or induce expression of a gene whose expression is induced or activated by an environmental stress.

For example, HSFA2 gene, DREB2A gene, HSP gene and the like are genes whose expression is induced (expression is activated) when an environmental stress such as high temperature, drying and the like, and expression of these genes can be activated (induced) by the aforementioned unsaturated carbonyl compound. That is, induction (activation) of the expression of these genes reveals various tolerances to environmental stresses.

Therefore, the present invention includes an activation agent (gene expression inducing agent, gene expression agent, gene-activating agent) for activating (or inducing) expression of a gene (e.g., at least one kind of gene selected from HSFA2 gene, DREB2A gene and HPS gene) involved in environmental stress tolerance (or whose expression is induced or activated by the action of environmental stress), which agent is constituted of at least one kind of unsaturated carbonyl compound selected from unsaturated aldehyde and unsaturated ketone.

In addition, the present invention also includes a method of activating (or inducing) expression of a gene (e.g., at least one kind of gene selected from HSFA2 gene, DREB2A gene and HPS gene) involved in environmental stress tolerance (or whose expression is induced or activated by the action of environmental stress) in plants, which includes treating plants with the above-mentioned activation agent, (that is, compound constituted of at least one kind of unsaturated carbonyl compound selected from unsaturated aldehyde and unsaturated ketone).

Effect of the Invention

In the present invention, not only heat tolerance (high-temperature tolerance) but also other tolerances (drought tolerance, disease tolerance, light resistance and the like) can be increased or improved. Particularly, in the present invention, tolerances such as heat tolerance and the like can be increased or improved without inhibiting photosynthesis.

Moreover, in the present invention, a tolerance improving agent constituted of a novel unsaturated carbonyl compound [for example, γ,δ-unsaturated carbonyl compound (4-heptenal and the like), ε,ζ-unsaturated carbonyl compound (6-nonenal and the like) and the like], which is capable of increasing or improving heat tolerance and the like can be provided.

Furthermore, in the present invention, an agent for activating (or expressing) a gene (HSFA2 gene, DREB2A gene, HSP gene and the like) effective for increasing or improving various tolerances can also be provided.

Furthermore, according to the tolerance improving agent of the present invention, tolerances such as heat tolerance and the like can be increased or improved even without gene recombination. Therefore, utilization in countries where planting of gene recombinant crops is prohibited and an effect on conventional varieties are expected.

DESCRIPTION OF EMBODIMENTS

[Tolerance Improving Agent]

The tolerance improving agent (tolerance inducing agent) of the present invention contains an unsaturated carbonyl compound. Such tolerance improving agent is effective for improving or increasing various properties of plants.

(Unsaturated Carbonyl Compound)

Unsaturated carbonyl compound is a carbonyl compound (compound having an oxo group) having an unsaturated bond.

As the unsaturated bond, carbon-carbon unsaturated bonds such as carbon-carbon double bond (=), carbon-carbon triple bond (≡) and the like can be mentioned. Unsaturated carbonyl compound may have an unsaturated bond alone or two or more kinds thereof may be used in combination.

In the unsaturated carbonyl compound, the number of the unsaturated bond is not particularly limited, and may be at least 1, for example, one or more (e.g., 1-4), preferably 1-3, further preferably 1-2, particularly 1.

In the unsaturated carbonyl compound, the position of the unsaturated bond is preferably at non-terminal (internal). Using such carbonyl compound having an internal unsaturated bond, inhibition of photosynthesis can be efficiently suppressed or prevented.

In addition, the position of the unsaturated bond is, for example, α,β-, β,γ-, γ,δ-, δ,ε-, ε,ζ- and the like relative to carbonyl carbon (oxo group-bonded carbon).

Particularly, the unsaturated carbonyl compound is preferably a compound that does not have only a β,γ-unsaturated bond (that is, a compound having at least an unsaturated bond other than β,γ-unsaturated bond). Compounds having a β,γ-unsaturated bond alone do not have high-temperature tolerance, and even when they have, they are often extremely poor in the ability, whereas compounds having an unsaturated bond other than the β,γ-unsaturated bond have surprisingly superior high-temperature tolerance.

In the present invention, therefore, a compound not having only a β,γ-unsaturated bond can be preferably used. Such unsaturated carbonyl compound may have a β,γ-unsaturated bond as long as it has an unsaturated bond other than the β,γ-unsaturated bond as an unsaturated bond.

The structure of the unsaturated carbonyl compound may be chain (straight-chain, branched-chain) or cyclic, and may be generally chain (particularly straight-chain).

While the carbon number of the unsaturated carbonyl compound is not particularly limited, it may be particularly not less than 4, for example, 4-20 (e.g., 4-16), preferably 4-12, further preferably 4-9.

The unsaturated carbonyl compound optionally has substituent(s). The substituent is not particularly limited and, for example, hetero atom-containing group {for example, oxygen atom-containing group [for example, hydroxyl group, alkoxy group (e.g., $C_{1-4}$ alkoxy group such as methoxy group, ethoxy group and the like)] and the like}, a halogen atom (e.g., fluorine atom, chlorine atom, bromine atom, iodine atom) and the like can be mentioned. The unsaturated carbonyl compound may have these substituents alone or two or more kinds thereof may be used in combination.

When the unsaturated carbonyl compound has isomers (E-form, Z-form and the like), any isomer may be used.

Examples of the representative unsaturated carbonyl compound include (i) an α,β-unsaturated carbonyl compound, (ii) an unsaturated carbonyl compound having an α,β-unsaturated bond and an unsaturated bond other than β,γ-unsaturated bond and the like.

Examples of the (i) α,β-unsaturated carbonyl compound include α,β-unsaturated aldehyde [for example, α,β-alkenal such as 2-butenal, 2-pentenal, 2-hexenal, 2-heptenal, 2-octenal, 2-nonenal and the like (e.g., α,β-alkenal having 4-20 (preferably 4-12, further preferably 4-9) carbon atoms, particularly α,β-alkenal having an unsaturated bond at non-terminal) and the like], α,β-unsaturated ketone [for example, α,β-alkanone such as 3-penten-2-one, 2-hexen-3-one, 3-hepten-2-one, 2-octen-4-one and the like (e.g., α,β-alkanone having 5-20 (preferably 5-12, further preferably 5-9) carbon atoms, particularly α,β-alkanone having an unsaturated bond at non-terminal) and the like] and the like.

Examples of the (ii) unsaturated carbonyl compound having an α,β-unsaturated bond and an unsaturated bond other than β,γ-unsaturated bond include γ,δ-unsaturated carbonyl compound {for example, γ,δ-unsaturated aldehyde [for example, γ,δ-alkenal such as 4-hexenal, 4-heptenal and the like (e.g., γ,δ-alkenal having 6-20 (preferably 6-12, further preferably 6-9) carbon atoms, particularly γ,δ-alkenal having an unsaturated bond at non-terminal)], γ,δ-unsaturated ketone [for example, γ,δ-alkanone such as 5-octen-2-one and the like (e.g., γ,δ-alkanone having 7-20 (preferably 7-12, further preferably 7-9) carbon atoms, particularly γ,δ-alkanone having an unsaturated bond at non-terminal) and the like]}, δ,ε-unsaturated carbonyl compound {for example, δ,ε-unsaturated aldehyde [for example, δ,ε-alkenal such as 5-heptenal, 5-octenal, 5-nonenal and the like (e.g., δ,ε-alkenal having 7-20 (preferably 7-12, further preferably 7-9) carbon atoms, particularly δ,ε-alkenal having an unsaturated bond at non-terminal)], δ,ε-unsaturated ketone [for example, δ,ε-alkanone such as 6-nonen-2-one and the like (e.g., δ,ε-alkanone having 8-20 (preferably 8-12, further preferably 8-9) carbon atoms, particularly δ,ε-alkanone having an unsaturated bond at non-terminal) and the like] and the like}, ε,ζ-unsaturated carbonyl compound {for example, ε,ζ-unsaturated aldehyde [for example, ε,ζ-alkenal such as 6-octenal, 6-nonenal and the like (e.g., ε,ζ-alkenal having 8-20 (preferably 8-12, further preferably 8-9) carbon atoms, particularly ε,ζ-alkenal having, an unsaturated bond at non-terminal)], ε,ζ-unsaturated ketone [for example, ε,ζ-alkanone such as 7-nonen-2-one and the like (e.g., ε,ζ-alkanone having 9-20 (preferably 9-12, further preferably 9) carbon atoms, particularly ε,ζ-alkanone having an unsaturated bond at non-terminal) and the like] and the like} and the like.

The unsaturated carbonyl compound may be used alone or two or more kinds thereof may be used in combination.

(Other Component)

The tolerance improving agent may be constituted of an unsaturated carbonyl compound alone, and may contain other components as necessary. For example, the tolerance improving agent may be formulated from an unsaturated carbonyl compound together with a carrier (inert carrier). To be specific, an unsaturated carbonyl compound may be dissolved, suspended, mixed, impregnated, adsorbed, adhered and the like by blending with a suitable inert carrier together with an adjuvant as necessary at an appropriate ratio, and formulated and used in an appropriate dosage form, for example, suspension, creamy suspension, emulsion, liquid, wettable powder, water dispersible granule, granules, powders, tablet, jumbo agent and the like.

The inert carrier may be any of solid and liquid. Examples of the solid inert carrier include vegetable powders (e.g., soybean flour, cereal flour, wood flour, bark flour, saw dust, tobacco stalk powder, walnut shell flour, wheat bran, cellulose powder etc.), synthetic polymer such as pulverized synthetic resin and the like, clays (e.g., kaolin, bentonite, acid clay etc.), talcs (e.g., talc, pyrophyllite etc.), silicas (e.g., diatomaceous earth, silica sand, mica etc.), activated carbon, natural minerals (e.g., sulfur powder, pumice, attapulgite, zeolite etc.), baked diatomaceous earth, brick pulverized product, fly ash, sand, plastic carrier (e.g., polyethylene, polypropylene, polyvinyldene chloride etc.), inorganic mineral powders (e.g., calcium carbonate, calcium phosphate etc.), chemical fertilizers (e.g., ammonium sulfate, ammonium phosphate dibasic, ammonium nitrate, urea, ammonium chloride etc.), compost and the like, which may be used alone, or two or more kinds thereof may be used in the form of a mixture.

Examples of the liquid inert carrier include water, alcohols (e.g., methanol, ethanol, isopropyl alcohol, butanol, ethylene glycol etc.), ketones (e.g., acetone, methylethyl ketone, methyl isobutyl ketone, diisobutylketone, cyclohexanone etc.), ethers (e.g., ethylether, dioxane, cellosolve, dipropylether, tetrahydrofuran etc.), aliphatic hydrocarbon (e.g., kerosene, mineral oil etc.), aromatic hydrocarbons (e.g., benzene, toluene, xylene, solvent naphtha, alkylnaphthalene etc.), halogenated hydrocarbons (e.g., dichloroethane, chloroform, carbon tetrachloride etc.), esters (e.g., ethyl acetate, diisopropylphthalate, dibutylphthalate, dioctylphthalate etc.), nitriles (e.g., acetonitrile etc.), dimethyl sulfoxide and the like, which may be used alone, or two or more kinds thereof may be used in the form of a mixture.

An adjuvant may be used as necessary, and it may be used alone, or two or more kinds thereof may be used in combination. To emulsify, disperse, solubilize or the like the active ingredient compound, a surfactant can be used as an adjuvant. Examples of the surfactant include, but are not limited to, polyoxyethylene alkyl ether, polyoxyethylene alkyl aryl ether, polyoxyethylene higher fatty acid ester, polyoxyethylene resin acid ester, polyoxyethylene sorbitan alkylate, polyoxyethylene sorbitan monolaurate, polyoxyethylene sorbitan monooleate, alkylarylsulfonate, naphthalenesulfonic acid condensate, lignin sulfonate, higher alcohol sulfuric acid ester and the like.

For the dispersion stability, adhesion, binding and the like of the unsaturated carbonyl compound, for example, starch, methyl cellulose, carboxymethyl cellulose, gum arabic, polyvinyl alcohol, turpentine oil, bran oil, bentonite, lignin sulfonate and the like can be used as an adjuvant. To improve flowability of the solid product, for example, wax, stearate, alkyl phosphate and the like can be used as an adjuvant. As the defoaming agent, for example, silicone oil and the like can be used as an adjuvant.

When the tolerance improving agent contains other component, the blending ratio of the unsaturated carbonyl compound relative to the whole tolerance improving agent is not particularly limited, and is, for example, about 0.01-about 90 mass %, and may be about 0.1-about 50 mass %.

[Use of Tolerance Improving Agent and Tolerance Improving Method]

The tolerance improving agent of the present invention is useful for improving or increasing various properties of plants.

Particularly, the tolerance improving agent of the present invention can increase or improve heat tolerance (high-temperature tolerance), as well as other tolerance (environmental stress tolerance).

The heat tolerance (high-temperature tolerance) refers to tolerance to a high temperature (high temperature condition) temporarily or constantly exposed to, and the high temperature may be, for example, not less than 25° C. (e.g., 27-70° C.), preferably not less than 30° C. (e.g., 32-60° C.), further preferably not less than 35° C. (e.g., 38-55° C.), particularly not less than about 40° C. (e.g., 42-50° C.).

Other tolerance may be at least one kind of tolerance selected from drought tolerance, disease tolerance, light resistance (UV resistance), oxidation resistance, tolerance to low temperature (low temperature tolerance), osmotolerance and salinity tolerance. Particularly, other tolerance may include at least drought tolerance.

Accordingly, the present invention includes a method of increasing or improving tolerance of a plant by using the above-mentioned tolerance improving agent. In such method, generally, a plant is treated with a tolerance improving agent to increase or improve tolerance of the plant. Such tolerance increasing or improving effect can also be evaluated based on the expression (or activation) of a gene related to (or involved in) these tolerances of the plant.

The plant to which the tolerance improving agent of the present invention (or the method of the present invention) can be applied is not particularly limited as long as it has pores. Preferred are agrohorticultural plants. Specific examples of the plant (particularly, agrohorticultural plant) include cereals (rice, barley, wheat, rye, oats; corn etc.), legumes (soybean, red bean, broad bean, pea, peanut etc.), fruit trees fruits (apple, citrus, pear, grapes, peach, plum, yellow peach, walnut, almond, banana, strawberry etc.), vegetables (cabbage, tomato, eggplant, spinach, broccoli, lettuce, onion, green onion, green pepper etc.), root vegetables (carrot, potato, sweet potato, radish, turnip etc.), crops for processing (cotton, hemp, mulberry, paper bush, rape seed, beet, hop, sugarcane, sugar beet, olive, rubber, coffee, tobacco, tea etc.), cucurbits (squash, cucumber, watermelon, melon etc.), pastures (orchard grass, sorghum, timothy, clover, alfalfa etc.), grasses (Korean lawn grass, bent grass etc.), flowering plants (chrysanthemum, rose, orchid etc.), crops for flavor (lavender, rosemary, thyme, parsley, pepper, ginger etc.) and the like.

The treatment of plant refers to having the tolerance improving agent (or unsaturated carbonyl compound) reach the target plant. Therefore, for example, the tolerance improving agent may be directly applied or may be appropriately diluted with water and the like and an effective amount for inducing tolerance in the target plant may be applied to the target plant or a cultivation carrier for the target plant. For example, application methods such as direct spray to the target plant, plant foot treatment, row treatment, soil incorporation and the like can be preferably used. In addition, a hydroponic solution for hydroponic culture may be treated with the tolerance improving agent. The method of the present invention is preferably a method of applying the tolerance improving agent of the present invention to a cultivation carrier, that is, application methods such as plant foot treatment, row treatment, soil incorporation, hydroponic solution treatment and the like. In a closed space such as a greenhouse and the like, moreover, a plant can also be treated (the plant is reached) by volatilizing the tolerance improving agent (or unsaturated carbonyl compound). While the treatment period of a plant with the tolerance improving agent is not particularly limited, for example, it is preferably before the period when high temperature injury is expected to occur.

The cultivation carrier means a support for cultivating a plant, and may be a material in which the plant can grow. For example, it includes so-called various soils, nursery mats, water and the like. Specifically, for example, sand, vermiculite, cotton, paper, diatomaceous earth, agar, gelatinous materials, polymeric materials, rock wool, glass wool, wood chips, bark, pumice and the like can be mentioned.

While the amount of the tolerance improving agent to be used (application dose, treatment dose) varies depending on the blending ratio of the unsaturated carbonyl compound, weather conditions, formulation form, application time, application method, application site, target plant and the like, it is appropriately selected from the range of generally about 0.01 g-about 10 g, preferably about 0.1-about 5 g, per 1 are based on the unsaturated carbonyl compound, and applied.

The concentration of the unsaturated carbonyl compound when the tolerance improving agent is applied to a cultivation carrier may be, for example, about 0.01-about 1000 µM, preferably about 0.05-about 500 µM, further preferably about 0.1-about 100 µM.

[Gene Activation Agent]

The tolerance improving agent of the present invention (or unsaturated carbonyl compound) has a function to induce (or activate) expression of a gene expressed by the action of an environmental stress (or expression is induced or activated).

For example, it is known that expression of HSFA2 gene and HSP gene is induced (or activated) by the action of an environmental stress such as high temperature, UV property, oxidation and the like.

Also, it is known that the expression of DREB2A gene is activated by the action of an environmental stress such as drying, low temperature, oxidation, injury, ultraviolet rays, osmotic pressure change and the like.

As for the relationship between these genes and various environmental stresses, the following documents and the like can be referred to.

HSAF2 gene: Scharf et al. Biochimica et Biophysica Acta 1819:104-119 (2012)

HSP gene: Timperio et al. Journal of Proteomics 71:391-411 (2008)

DREB2A gene: Sakuma et al. Proceedings of the National Academy of Sciences, USA 103:18822-18827 (2006)

That is, activation of such gene expression can increase or improve tolerance of the gene to the corresponding environmental stress.

Therefore, the present invention includes an activation agent constituted of an unsaturated carbonyl compound, which activates (or induces) expression of a gene involved in the environmental stress tolerance (in detail, gene whose expression is activated or induced by the action of an environmental stress, for example, HSFA2 gene, DREB2A gene, HSP gene and the like).

The present invention is not limited by the aforementioned each embodiment and example, and can be variously modified. An embodiment obtained by appropriately combining technical means respectively disclosed in different embodiments is also encompassed in the technical scope of the present invention. In addition, all of the academic documents and patent documents described in the present specification are incorporated in the present specification by reference.

EXAMPLES

The present invention is explained in detail in the following by referring to Examples, which are not to be construed as limitative.

In the Examples, various properties were measured (or analyzed) as follows.

[Expression Level of HSFA2 Gene and DREB2A Gene]

Total RNA was extracted using RNeasy Plant Mini Kit (Quiagen), and cDNA was successively synthesized using RevaTra Ace Kit (TOYOBO CO., LTD.).

HSFA2 gene and DREB2A gene were quantified using SYBR Green qPCR Mix (TOYOBO CO., LTD.), LineGene Real-time PCR detection system (BioFlux).

The primers used for each gene expression analysis are as described below.

```
HSFA2:
                                         (SEQ ID NO: 1)
GCAAGGAACGTCATCATCTG, (SEQ ID NO: 2)
ATCAGCAAGGATCTGGGATG;

DREB2A:
                                         (SEQ ID NO: 3)
GTGGAGTGGAGCCGATGTAT, (SEQ ID NO: 4)
ATCGTCGCCATTTAGGTCAC;

Actin2 (comparison target gene):
                                         (SEQ ID NO: 5)
ACCAGCTCTTCCATCGAGAA, (SEQ ID NO: 6)
GAACCACCGATCCAGACACT
```

[Expression Level of HSP Gene]

HSP gene was quantified by microarray analysis. The total RNA was extracted using RNeasy Plant Mini Kit (Quiagen), and double stranded cDNA was synthesized using Superscript Choice System (Life Technologies). cDNA was labeled with Cy3 by using NimbleGen One-color Labeling Kit (NimbleGen), and hybridized to DNA array (ATH6_60 mer_expr X4, NmibleGen) at 42° C. for 6 hr. DNA array was washed, Cy3 fluorescence intensity was measured by Axon GenePix 4000B scanner (NimbleGen) and quantified.

[Photosynthesis Activity]

The photosynthesis activity was measured using the maximum quantum yield (Fv/Fm) of photochemical system II as an index. Test plant object was subjected to dark adaptation (for 5 min), and Fv/Fm was measured using photosynthesis measuring apparatus Junior-PAM (Walz). The measurement was performed at least three times for different sites of the leaf and the averaged numerical value was taken as photosynthesis activity.

Example 1

The tolerance improving effect by the tolerance improving agent was confirmed in a plastic greenhouse growing strawberry (cultivar: Tochiotome).

Two kinds of test solutions containing 2-hexenal (trans-2-hexenal) [test solution A (mixed solution of 2-hexanal 1.2 ml, surfactant 0.2 mL, ethanol 498.6 mL and water 500 mL), test solution B (mixed solution of 2-hexanal 1.2 ml and water 998.4 mL)] were prepared.

Then, the strawberry (strawberry leaves) was treated with the test solution under the following conditions, and cultivation of strawberry was continued for about 3 days (June 25, 11 o'clock-June 28, 12 o'clock) in each greenhouse (5.4 m×50 m, height average about 2 m). For comparison, a greenhouses (greenhouse C), which is free of the treatment with the test solution, was also prepared.

Greenhouse A: test solution A (108 mL) was placed in a cup, and installed at 4 locations in the house (standing group)

Greenhouse B: test solution B was diluted 10-fold with water, sprayed at a ratio of 1000 L per 10 areas of field area (sprayed group)

Greenhouse C: a test solution is not installed or sprayed (untreated group)

During the 3 days, the temperature in the green house was as described below. The temperature was measured by a temperature sensor installed at 2 locations at 60 cm and 160 cm from the ground.

Day 1 (spraying at 11 o'clock and standing): weather in the afternoon was sunny. The temperature inside the greenhouse rose to 48° C. at maximum. Generally, the temperature was 44-48° C. at least for 3 hr.

Day 2: morning was cloudy, and afternoon was rainy. Therefore, the temperature inside the greenhouse did not rise much and was about 30° C. at maximum.

Day 3: weather was sunny. The temperature inside the greenhouse rose to about 35° C. at maximum. During the day, the temperature was generally not less than 20° C., and exceeded 30° C. at least for 6 hr.

After cultivation for about 3 days, 180 stumps of strawberry were observed, and the presence or absence of high temperature damage was evaluated by the following criteria.

Degree 1: light browning was seen in one leaf in one stump

Degree 2: browning was seen in 2-3 leaves in one stump

Degree 3: severe browning or partial withering was seen in not less than 2 leaves in one stump The results are shown in the following Table 1.

TABLE 1

| | number of stumps | | |
|---|---|---|---|
| | Degree 1 | Degree 2 | Degree 3 |
| greenhouse A (standing group) | 40 | 22 | 10 |
| greenhouse B (sprayed group) | 33 | 9 | 5 |
| greenhouse C (untreated group) | 23 | 25 | 15 |

As is clear from the results of Table 1, it was found that a treatment with the tolerance improving agent of the present invention markedly improves high-temperature tolerance as compared to non-treatment.

In both the standing group and the sprayed group, growth similar to the untreated group was found, and a delay in the growth due to the inhibition of photosynthesis by the tolerance improving agent was not observed at all.

Example 2

Arabidopsis (Arabidopsis thaliana, Columbia-0) was exposed to the compound shown in Table 2 in a gaseous state (concentration 10 nmol/cm$^3$) for 30 min (temperature 23° C.), and the expression level of HSFA2 gene was analyzed.

Arabidopsis was seeded in artificial soil material "Jiffy-7" (SAKATA SEED CORPORATION), cultured for 14 hr in light period/10 hr in dark period at 23° C. for 2-3 weeks and used.

The results are shown in Table 2. In Table 2, numerical values are relative values with acetonitrile as 1, and a larger numerical value indicates that the gene is more activated.

TABLE 2

| | relative transcription level (fold) |
|---|---|
| acetonitrile | 1 |
| (E)-2-butenal | 469 |
| (E)-2-pentenal | 470 |
| (E)-2-hexenal | 377 |
| (E)-2-heptenal | 642 |
| (E)-2-octenal | 777 |
| (E)-2-nonenal | 488 |
| (Z)-4-heptenal | 320 |
| (Z)-6-nonenal | 270 |
| (E)-3-hepten-2-one | 266 |
| (E)-2-hexenol | 0.735 |
| n-hexenal | 7.9 |
| 2-heptanone | 1.1 |

As is clear from the results of Table 2, the tolerance improving agent of the present invention (unsaturated carbonyl compound) was found to activate HSFA2 gene.

Example 3

Tomato (Solanum lycopersicum, Microtom) was exposed to (E)-2-hexenal in a gaseous state (concentration 10 nmol/cm$^3$) for 30 min (temperature 25° C.), and the expression level of HSFA2 gene was analyzed to find 20.2-fold (relative transcription level with non-exposure to (E)-2-hexenal as 1).

The results reveal that HSFA2 gene was activated also in tomato.

The tomato was seeded in artificial soil material "Jiffy-7" (SAKATA SEED CORPORATION), cultured for 14 hr in light period/10 hr in dark period at 23° C. for 2-3 weeks and used.

Example 4

Rice (Oryza sativa, Nipponbare) was exposed to (E)-2-hexenal in a gaseous state (concentration 10 nmol/cm$^3$) for 30 min (temperature 25° C.), and the expression level of HSFA2 gene and DREB2A gene was analyzed. As a result, the expression level of HSFA2 gene was 3.55-fold (relative transcription level with non-exposure to (E)-2-hexenal as 1), and the expression level of DREB2A was 3.93-fold (relative transcription level with non-exposure to (E)-2-hexenal as 1).

The results reveal that HSFA2 gene was activated also in rice. It was also found that the tolerance improving agent of the present invention activates DREB2A gene.

The rice was seeded in artificial soil material "Jiffy-7" (SAKATA SEED CORPORATION), cultured for 14 hr in light period/10 hr in dark period at 23° C. for 2-3 weeks and used.

Example 5

Arabidopsis (Arabidopsis thaliana, Columbia-0) was exposed to the compound shown in Table 3 in a gaseous state (concentration 10 nmol/cm$^3$) for 120 min, left standing for 120 min in an environmental control chamber (manufactured by NIPPON MEDICAL & CHEMICAL INSTRUMENTS CO., LTD.) set to 40-45° C. and in the presence of light (100 μmol/m$^2$·s), and the survival rate after lapse of 3 days was measured.

Arabidopsis was seeded in artificial soil material "Jiffy-7" (SAKATA SEED CORPORATION), cultured for 14 hr in light period/10 hr in dark period at 23° C. for 2-3 weeks and used.

The results are shown in Table 3. In Table 3, the survival rate is a relative value with the survival rate of a non-exposure sample (sample left standing at 45° C. for 120 min without exposure to the compound) as 100(%).

TABLE 3

| | survival rate (%) after 3 days |
|---|---|
| Non-exposure | 100 |
| (E)-2-butenal | 140 |
| (E)-2-hexenal | 170 |
| (E)-3-hepten-2-one | 159 |

As is clear from the results of Table 3, it was found that a treatment with the tolerance improving agent of the present invention improves high-temperature tolerance as compared to non-treatment, and can improve the survival-rate.

Even when exposed, the growth was similar to that with non-exposure, and a delay in the growth due to the inhibition of photosynthesis by the tolerance improving agent was not observed at all.

Example 6

Arabidopsis (Arabidopsis thaliana, Columbia-0) was exposed to the compound shown in Table 4 in a gaseous, state (concentration 25 nmol/cm$^3$) for 120 min (temperature 25° C.) in the presence of light (100 μmol/m$^2$·s), subjected to a dark adaptation treatment for 5 min, and photosynthesis activity (Fv/Fm) was measured.

*Arabidopsis* was seeded in artificial soil material "Jiffy-7" (SAKATA SEED CORPORATION), cultured for 14 hr in light period/10 hr in dark period at 23° C. for 2-3 weeks and used.

The results are shown in Table 4.

TABLE 4

| | photosynthesis activity (Fv/Fm) |
|---|---|
| acetonitrile | 0.729 |
| 2-propenal | 0.393 |
| (E)-2-butenal | 0.726 |
| (E)-2-pentenal | 0.710 |
| (E)-2-hexenal | 0.739 |
| (E)-2-heptenal | 0.748 |
| (E)-2-octenal | 0.732 |
| (E)-2-nonenal | 0.741 |
| (E)-2-decenal | 0.753 |
| (Z)-4-heptenal | 0.743 |
| (Z)-6-nonenal | 0.745 |

As is clear from the results of Table 4, it was found that the tolerance improving agent of the present invention does not inhibit photosynthesis.

Example 7

*Arabidopsis* (*Arabidopsis thaliana*, Columbia-0) was exposed to (E)-2-hexenal in a gaseous state (concentration 10 nmol/cm$^3$) for 30 min (temperature 23° C.), and the expression level of HSP genes (HSP17.6-C, HSP17.6-A) was analyzed.

*Arabidopsis* was seeded in artificial soil material "Jiffy-7" (SAKATA SEED CORPORATION), cultured for 14 hr in light period/10 hr in dark period at 23° C. for 2-3 weeks and used.

The results are shown in Table 5. In Table 5, numerical values are relative values with non-exposure to (E)-2-hexenal as 1, and a larger numerical value indicates that the gene is more activated.

TABLE 5

| | Relative transcription level (fold) | |
|---|---|---|
| | HSP17.6-C | HSP17.6-A |
| (E)-2-hexenal | 45.9 | 36.3 |

As is clear from the results of Table 5, it was found that the tolerance improving agent of the present invention activates HSP gene.

INDUSTRIAL APPLICABILITY

The tolerance improving agent of the present invention stimulates (or induces), without using the gene recombination technology, the environmental stress tolerance mechanism which is universally present in plants and can increase or improve various environmental stress tolerances (heat tolerance, drought tolerance and the like) in a wide variety of plants.

Since the agent does not inhibit photosynthesis, it can increase or improve such environmental stress tolerances while maintaining the growth of plants. Furthermore, an unsaturated carbonyl compound, which is the active ingredient of the tolerance improving agent of the present invention, is a component generally available from nature, and can be used safely.

The invention claimed is:

1. A method of increasing or improving high-temperature tolerance of a plant at 27-70° C. without inhibiting photosynthesis, comprising treating a leaf of the plant with at least one kind of chain unsaturated carbonyl compound, wherein the chain unsaturated carbonyl compound has 4-9 carbon atoms, does not have an unsaturated bond at the terminal, and is at least one kind selected from α,β-unsaturated aldehyde, α,β-unsaturated ketone, γ,δ-unsaturated aldehyde, γ,δ-unsaturated ketone, δ,ε-unsaturated aldehyde, δ,ε-unsaturated ketone, ε,ζ-unsaturated aldehyde, and ε,ζ-unsaturated ketone, wherein the high-temperature tolerance of the plant at 27-70° C. is increased or improved without inhibiting photosynthesis.

2. The method of claim 1, which is performed in a greenhouse.

3. The method of claim 1, wherein at least one kind of chain unsaturated carbonyl compound is applied as a mixed solution with water to the plant.

* * * * *

SEQUENCE LISTING

```
<160> NUMBER OF SEQ ID NOS: 6

<210> SEQ ID NO 1
<211> LENGTH: 20
<212> TYPE: DNA
<213> ORGANISM: Artificial Sequence
<220> FEATURE:
<223> OTHER INFORMATION: primer

<400> SEQUENCE: 1
gcaaggaacg tcatcatctg                                                   20

<210> SEQ ID NO 2
<211> LENGTH: 20
<212> TYPE: DNA
<213> ORGANISM: Artificial Sequence
<220> FEATURE:
<223> OTHER INFORMATION: primer

<400> SEQUENCE: 2
atcagcaagg atctgggatg                                                   20

<210> SEQ ID NO 3
<211> LENGTH: 20
<212> TYPE: DNA
<213> ORGANISM: Artificial Sequence
<220> FEATURE:
<223> OTHER INFORMATION: primer

<400> SEQUENCE: 3
```

```
gtggagtgga gccgatgtat                                              20

<210> SEQ ID NO 4
<211> LENGTH: 20
<212> TYPE: DNA
<213> ORGANISM: Artificial Sequence
<220> FEATURE:
<223> OTHER INFORMATION: primer

<400> SEQUENCE: 4
atcgtcgcca tttaggtcac                                              20

<210> SEQ ID NO 5
<211> LENGTH: 20
<212> TYPE: DNA
<213> ORGANISM: Artificial Sequence
<220> FEATURE:
<223> OTHER INFORMATION: primer

<400> SEQUENCE: 5
accagctctt ccatcgagaa                                              20

<210> SEQ ID NO 6
<211> LENGTH: 20
<212> TYPE: DNA
<213> ORGANISM: Artificial Sequence
<220> FEATURE:
<223> OTHER INFORMATION: primer

<400> SEQUENCE: 6
gaaccaccga tccagacact                                              20
```